May 21, 1940.  J. W. SRODULSKI  2,201,655
DISPENSING MACHINE
Filed Sept. 21, 1938  2 Sheets-Sheet 1

Joseph W. Srodulski
INVENTOR.
BY Clarence E. Threedy
HIS ATTORNEY.

May 21, 1940.   J. W. SRODULSKI   2,201,655
DISPENSING MACHINE
Filed Sept. 21, 1938   2 Sheets—Sheet 2
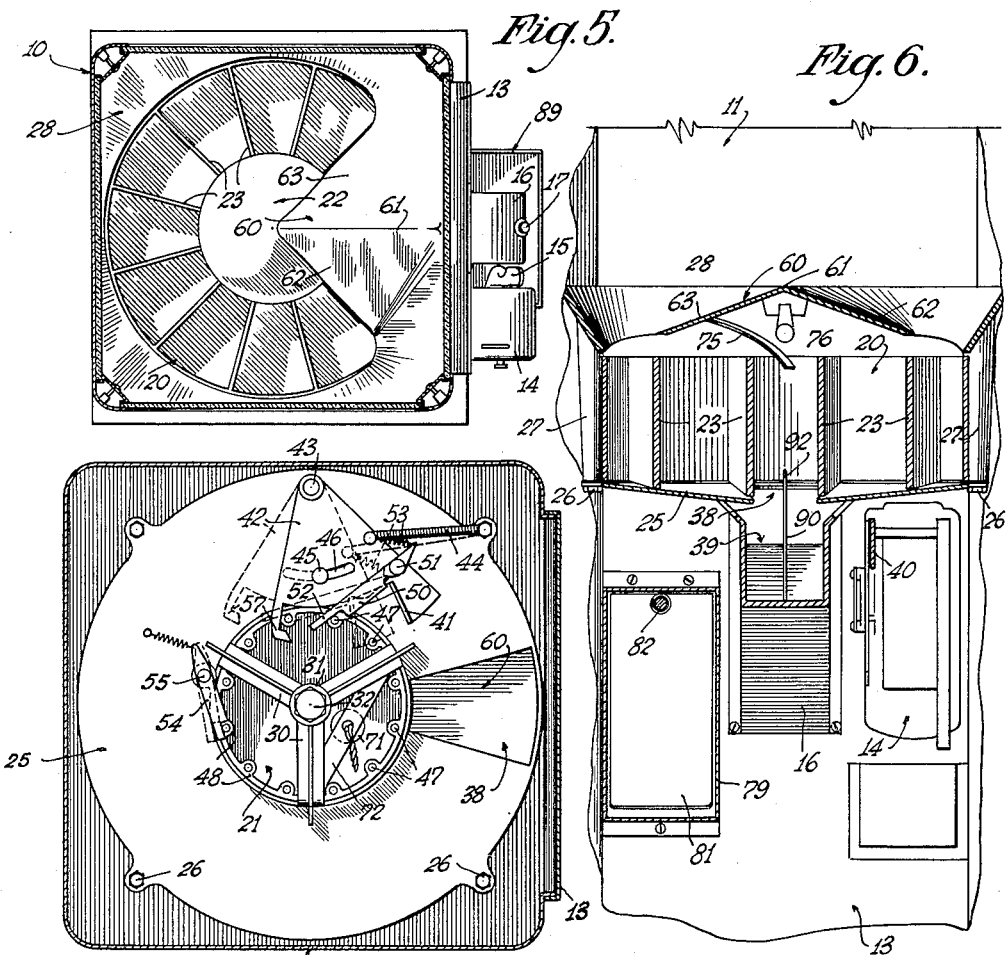
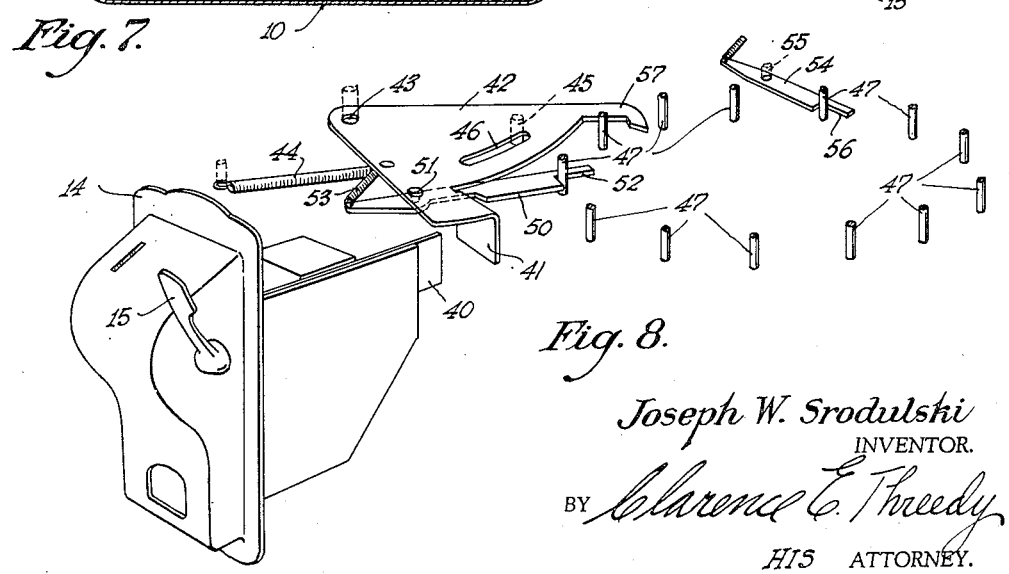
Joseph W. Srodulski
INVENTOR.
BY Clarence E. Threedy
HIS ATTORNEY.

Patented May 21, 1940

2,201,655

UNITED STATES PATENT OFFICE 2,201,655

DISPENSING MACHINE

Joseph W. Srodulski, Chicago, Ill.

Application September 21, 1938, Serial No. 231,011

9 Claims. (Cl. 221—108)

This invention relates to dispensing machines and particularly to improvements in a machine adapted to vend pop corn and analogous substances, one of the principal objects being the provision of improved measuring or metering means for dispensing predetermined quantities of merchandise upon each operation of the machine.

Another important object is the provision of a combination metering and heating device in the form of a member having a plurality of compartments arranged about a central portion constituting a hub, with heating means in the hub adapted to warm the contents of the several compartments.

Another object is the arrangement of a combination metering and heating device of the type hereinabove characterized, in which the bottoms of the compartments are open and there is a stationary bottom member having a discharge opening relative to which the metering member is rotated so as to bring the compartments successively into register with the discharge opening, there being further provided automatic feeding or refilling means including a hopper arranged above the metering member so as to effect gravitating movement of the vendible matter into the compartments of the metering device.

Another object is the provision of guide or deflecting means for distributing vendible or dispensed matter into a predetermined manner in its movement from the hopper into the compartments.

A further object is the provision of means for automatically agitating the contents of a compartment of the metering drum or device at the time said compartment moves into discharge position to assure proper movement of the contents of the compartment into a discharge chute.

Still another object is the provision of means for agitating the dispensed matter as the same moves out of a compartment into a discharge chute, and for further agitating the dispensed matter as it moves through a discharge chute responsive to the opening of a discharge door or gate in the chute.

Still another object is the provision of improved mechanism for moving the metering device in step by step operation and preventing fraudulent partial or rapid movement of the metering mechanism.

Other novel aspects and objects of the invention reside in certain details of construction including the form and location of parts in the illustrative embodiment, all of which will become apparent as the following description proceeds in view of the drawings in which:

Fig. 5 is a horizontal section along line 5—5 of Fig. 2, showing the metering drum and deflecting apron in top plan view;

Fig. 6 is a fragmentary vertical elevation of the inner side of the control panel as viewed in the direction of line 6—6 of Fig. 2, with portions of the metering drum shown in section;

Fig. 7 is a bottom plan view of the metering drum and operating mechanism therefor; while Fig. 8 is a perspective layout of the operating mechanism for the dispensing or metering means.

Figure 1:
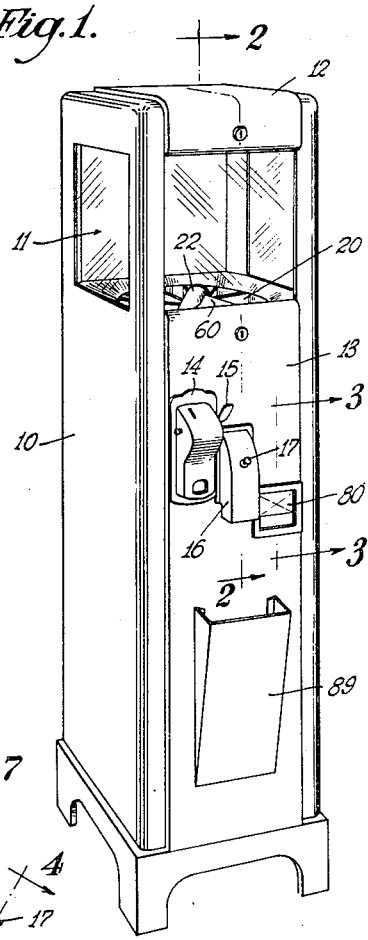
Fig. 1 is a perspective of the dispensing machine.

In the illustrative embodiment shown in Fig. 1, the dispensing machine includes an upright cabinet member 10 with a glass enclosed hopper section 11 arranged in its upper region and provided with a removable top member 12 through which access may be had to the hopper for the purpose of filling the latter with vendible matter, such as pop corn, peanuts, or analogous matter. The front of the cabinet is provided with a removable operating panel 13 on which there is situated a coin control device 14 having an operating lever 15. Also mounted on the panel 13 is a downwardly inclined discharge chute 16 provided with an operating plunger 17 adapted to actuate a door within the chute for release of merchandise subsequent to operation of the coin control lever 15.

Figure 2:
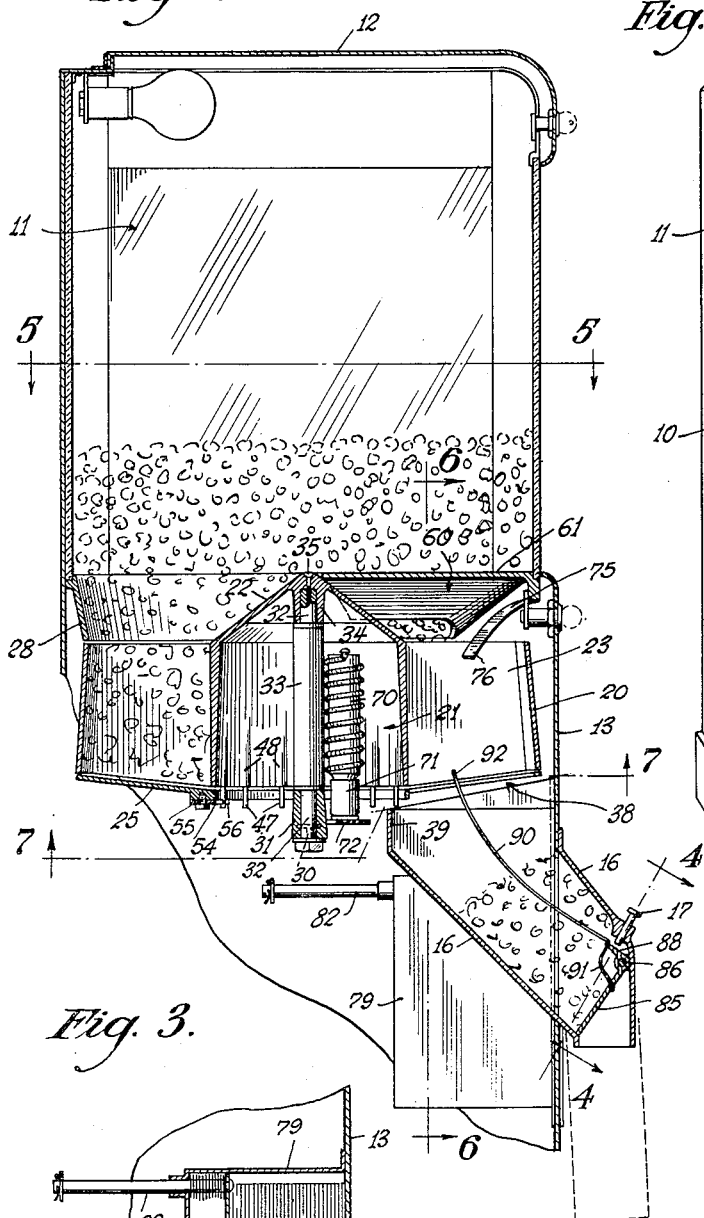
Fig. 2 is a fragmentary vertical side section drawn to enlarged scale and taken along line 2—2 of Fig. 1.

One of the important features of the invention is the improved metering or dispensing mechanism, a preferred embodiment of which is shown in Fig. 2, particularly, and which includes a drum 20 having a hollow hub portion 21 open at its bottom and provided with a conical dome 22. Extending radially from the hub portion 21 are a plurality of partition webs 23 (see also Fig. 5) which provide a plurality of radially disposed merchandise compartments which are open at both top and bottom. The metering drum is mounted for rotation about a vertical axis above a bottom member or support 25 (Fig. 7 also) attached by means such as the bolts 26 to depending bosses 27 formed integrally with a hopper guide casting 28 (Fig. 6 also). Formed as a part of the bottom support 25 are a plurality of spider arms 30 converging into a hub portion 31.

The metering drum is mounted for rotation above the support 25 on a spindle bolt 32 which extends upwardly through a bore in the spider hub 31, there being an elongated spacing sleeve 33 on the bolt, the upper end of which bears against a depending boss 34 formed on the inner side of the dome of the drum hub. A retaining screw 35 is threaded through the nose of the drum into the end of the spindle bolt. Thus, the metering drum is arranged for rotation about the bolt 31 with the bottom-forming support 25 normally closing the open bottom portions of the several compartments.

A discharge opening 38 (Figs. 2, 6, 7) is formed in the support 25 at a predetermined position above the mouth 39 of the discharge chute 16. Thus, rotation of the drum will bring the compartments successively into register with the discharge opening 38 so that the contents of the compartments may be discharged into the chute 16.

Means for effecting step by step advancing movement of the metering drum includes a coin-operated control 14 (Fig. 8) which is preferably of the type described and claimed in my co-pending United States application, Serial No. 164,660, and which includes an operating lever 15 released upon deposit of a proper coin in the device and effective to shift a driving plate 40 inwardly for engagement with the depending flange 41 on a driving segment 42 pivotally mounted as at 43 (Fig. 7 also) so as to move the segment from its normally retracted position, into which it is urged by a retracting spring 44, into an advanced position limited by the displacement of the driving plate 40 and the stopping effect of a pin 45 working in an arcuate slot 46 in the plate.

A plurality of evenly spaced circumferentially arranged pins 47 depend from bosses 48 (Fig. 2) about the bottom portion of the hollow hub 21 on the metering drum, and a driving pawl 50 is pivoted on the segment 42 as at 51 and has a notched nose 52 arranged to engage one of the pins 47 by action of a normal spring 53 so that when the segment plate 42 is moved from normal to advanced position by operation of the coin lever 15, the metering drum will be advanced a distance adequate to bring the next succeeding compartment into register with the opening 38. A pawl 54 similar in construction to the pawl 50 and pivotally mounted as at 55 to the underside of the bottom plate 25 prevents retrograde movement of the drum by virtue of the stopping engagement of a notched nose portion 56 on the pawl with one of the pins 47 whenever the drum is advanced.

A feature of the driving mechanism is the means provided therein for preventing fraudulent operation of the metering drum, this means including, in addition to the foregoing particular arrangement of the driving segment 41—42—50, a stopping pawl 57 spaced opposite the lug 41 on the segment plate and formed in the nature of a hook so as to be projected between adjoining driving pins 47 when one of the latter is normally in driving engagement with the pawl 50. As a result of this arrangement, it is impossible to throw the drum 20 by quickly moving the control lever 15, since it is necessary that the segment 42 be moved to the limit (determined by the pin and slot means 45—56) in order to withdraw the stopping pawl 57 from the path of the pins. Therefore, unless the segment 42 is moved its full stroke, which requires a full deliberate stroke of the operating handle 15, the metering drum cannot be effectively moved. Moreover, a partial movement of the operating handle 15 is likewise ineffective to permit dispensing operation of the device without causing the coin to be collected in the control 14. The metering drum can be advanced in step by step movement only by deliberate and proper manipulation of the lever 15.

The several compartments of the metering drum are automatically refilled from the hopper 11 by an improved form of guide means including the member 28 (Figs. 2, 5, 6) which is provided with an annular opening overlying all but a few of the compartments in the drum, the wall portion of the member 28 being inclined downwardly so that the pop corn or other merchandise in the hopper 11 will be guided in gravitating movement downwardly into the compartments of the drum. The guide member 28 is further provided with a deflecting apron 60 which is peaked as at 61 to provide two oppositely inclined portions 62 and 63 overlying a predetermined number, preferably three, of the compartments in the region above the discharge opening 38 in the bottom-forming support 25. When one of the compartments is in register with the discharge opening 38, the open top portion of that compartment will be closed off from the hopper by the apron portion 60 so that as the contents of the compartment is emptied into the chute 16, there will be no replenishment of the contents of the compartment until the same has been moved a distance adequate to cause the open top portion of the same to pass beneath the edge of the downwardly inclined side portion 62 of the apron upon subsequent operation of the machine. It will be apparent that the downward inclination of the portion 62 of the apron will be effective to guide the pop corn or other merchandise in gravitating movement into the previously emptied compartment as the latter moves from beneath the apron.

As viewed in Fig. 5, the rotation of the metering drum 20 is clockwise, and there is a tendency of the pop corn to ride up against the inclined portion 63 of the apron. This becomes of importance as the hopper is emptied, since it tends to provide a full measure for the compartments approaching the apron with a consequent lessening of the amount of pop corn available for movement into the empty compartments close to the inclined portion 62 on the opposite side of the apron as the supply approaches exhaustion, so that one looking into the hopper 11 may observe whether any of the compartments is full or only partially so, and thus be enabled to determine whether he desires to operate the machine or not. It will be observed also that the oppositely inclined portions 62—63 of the apron cooperate with the conical shape of the drum portion 22 on the hub of the drum to effect distribution of the pop corn into the several compartments.

Another feature of the invention closely related to the form and mode of operation of the metering drum, resides in the means by which the contents of the compartments may be warmed.

Referring to Fig. 2, a heating device in the preferred form of an electrical heating element 70 is mounted in a socket 71 carried on a cross strap 72 attached between adjoining arms 30 of the spider so as to radiate heat against the inner wall portions of the hollow hub. The metering drum is preferably a casting of a highly conductive metal, such for example as aluminum, and heat from the device 70 is quickly transmitted throughout the entire body of the drum and particularly into the web or partition portions 23 and the dome portion 22, with the result that the pop corn in the compartments, as well as that in the hopper, is quickly warmed and will be maintained at a desired temperature which may be regulated by the power rating, size, and relative position of the heating device 70 in the hub. Also, considerable heat is transmitted to the guide member 28 and apron 60, which are also preferably aluminum castings, so that the entire contents of the hopper will be warmed, assuring the delivery of warm pop corn into the metering drum, regardless of the rapidity or number of times the metering drum may be operated in succession.

The bottom portion of the metering drum is spaced adequately from the support 25 to prevent unpopped kernels and the like from becoming jammed between the drum and the support, the latter being inclined toward the central open portion thereof surrounding the spider legs 30, so that all waste material from the compartments will be discharged through this open portion into a suitable container in the bottom of the machine.

Means for automatically agitating the contents of a compartment as it moves into register with the discharge opening, includes the provision of a resilient arm in the form of a leaf spring 75 (Figs. 2 and 6) securely attached at one end by any suitable means to a stationary member such as the under side of the guide member 28, the opposite end 76 of the spring being turned so as to project downwardly into the central region of a compartment in discharge position. As the drum rotates into discharge position, one of the partition webbings 23 thereof will bear against the depending end region 76 of the spring 75 and flex the spring into tensioned condition, so that as the next compartment moves into discharge position the tensioned spring will work down into the middle of the contents of the compartment, agitating the same to assure proper discharge movement of such contents into the chute 16.

Figure 3:
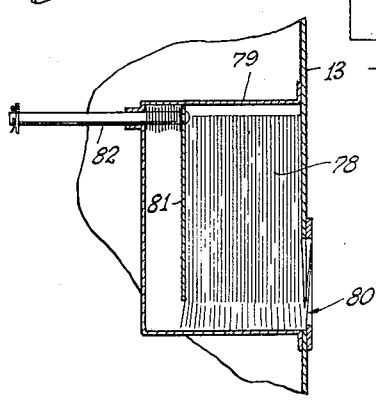
Fig. 3 is a vertical sectional detail of the bag container as viewed along line 3—3 of Fig. 1.

A stack of proper bags 78 (Figs. 1, 3, 6) is arranged in a compartment 79 on the inside of the control panel 13, there being an opening 80 in the latter communicating with the compartment and through which the patron may grasp one of the bags and withdraw the same for positioning beneath the discharge end of the chute 16. Means in the form of a spring-urged presser 81 carried on a slidable member 82, presses the stack of bags into proper dispensing position relative to the opening 80.

Figure 4:
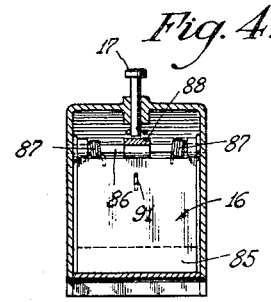
Fig. 4 is a transverse sectional detail through the discharge chute showing the inner side of the discharge gate or door as seen in the direction of line 4—4 of Fig. 2.

When the dispensing mechanism has been operated by manipulation of the coin control 15 and the contents of one compartment discharged into the chute 16, the pop corn or other merchandise is prevented from moving out of the chute 16 by a gate or door 85 (Figs. 2 and 4) pivoted as at 86 for movement into open position against the tension of closing springs 87 by engagement of the inner end of the plunger 17 with an offset tongue 88 on the door. Thus, the patron is enabled to procure and position a bag beneath the discharge chute and, by depressing the patron 17, may open the door 85 to permit movement of the pop corn into the positioned bag. Overflow or wastage may be collected in the bin 89 arranged on the panel 13.

A further means for agitating the pop corn as the compartments move into discharge position, includes a resilient arm in the form of a wire spring 90 attached at one end 91 to the door 85 and having its opposite end 92 projecting up through the opening 38 into the bottom central region of a registered compartment substantially opposite the free end of the spring 75 in the upper region of the compartment. Each time a compartment moves into discharge position, the spring 90, as well as the spring 75, will be tensioned and projected into the contents of the compartment for the purpose set forth. In addition, each time the gate 85 is opened, the spring arm 90 will be moved throughout its length so that the pop corn entering the discharge chute 16 will be agitated during opening movement of the gate 85.

In operation, the patron deposits a proper coin in the device 14 and depresses the lever 15, which effects movement of the segment plate 42 and a consequent displacement of the drum 20 to position the next succeeding compartment in register with the mouth 38 of the discharge chute 16, whereupon the contents of the compartment will descend into the chute against the door 85. The patron having removed a bag through the opening 80 and positioned the bag beneath the lower end of the chute 16, will then depress the button 17, thus opening the gate 85 and permitting the pop corn to gravitate into the bag.

With each advancing movement of the metering drum, those compartments moving toward the inclined portion 63 of the apron 60 (Fig. 5) will be passed beneath the stock of corn in the hopper at that position to assure full measure as the compartment moves toward discharge position. Moreover, movement of the drum relative to the apron 60 effects an agitation of the contents of the hopper, as well as of the compartments, so that the heat from the means 21—70 will be distributed additionally through the contents of the hopper and metering device.

The specific form of the construction set forth herein is chosen for purposes of illustration, and it is not intended that the invention shall be restricted to the various details specified except as may be provided in the appended claims.

Having thus described my invention, what I claim as new and desire to protect by Letters Patent is:

1. In a dispensing machine including a dispensing drum having open compartments adapted to receive merchandise matter from a source of supply arranged above the drum such that the merchandise matter tends to gravitate into the several compartments, means for rotating said drum to move said compartments successively into a discharge position, said compartments being arranged and constructed so that the contents thereof will be discharged therefrom when the compartments are in said discharge position, the combination with said drum of deflecting means including a member arranged to close off one of said compartments in said discharge position to prevent movement of merchandise matter from said source into said compartment, said deflecting member being pitched in opposite directions relative to the direction of movement of said drum to deflect merchandise matter in a direction back toward one of said compartments approaching said discharge position and into any compartment leaving said position, and a conical hub member for said drum positioned to guide merchandise matter from said source for movement in a general direction into said compartments and disposed for cooperation with said deflecting means to prevent merchandise matter from working beneath said deflecting means.

2. In a dispensing machine, a rotatable dispensing member constructed of heat conductive material and including a centrally located hub enclosure, a stationary source of heat mounted in said enclosure, and a plurality of integral web members extending from said hub enclosure to define article receiving pockets, articles in said pockets being heated in part at least by heat transmitted through said web members.

3. In a dispensing machine, a rotatable dispensing member and means for moving said dispensing member in steps in a particular direction, said means including a plurality of spaced driving elements arranged about the axis of rotation of said dispensing member, a driving member mounted for oscillation about an axis parallel to the axis of rotation of the dispensing member, mechanism for oscillating said driving member, pawl means coacting with said driving member to engage one of said driving elements for movement of the dispensing member in said particular direction when said driving member is moved in a particular direction, and stop means movable with said driving member and normally projecting in position for engagement with one of said driving elements to block movement of said dispensing member, said stop means being moved out of the path of said driving elements when said driving member is moved a predetermined distance in said particular direction.

4. In a dispensing machine including a rotatable article carrier and means providing a downwardly inclined discharge chute beneath said carrier, a normally closed door arranged at the lower end of said chute and mechanism for opening said door to release merchandise matter for gravitation out of the chute, and agitating means in the form of a resilient arm fixed at one end to said door and having opposite portions projecting in said chute toward the upper end thereof and into said carrier and effective to engage and agitate matter in said chute and carrier when said door is opened and when the carrier is rotated.

5. In a dispensing machine, a rotatable dispenser and means for rotating the same including an oscillable drive member, spaced means on said dispenser arranged about the axis of rotation thereof and coacting in succession with means on said drive member responsive to oscillation of the latter whereby said dispenser is moved in steps corresponding to the spacing between the succeeding spaced means thereon, and means normally positioned by said drive member in blocking relation to said spaced means to prevent effective movement of the dispenser and moved out of blocking position by the drive member only when the latter has moved a certain distance from an initial position, and means normally disposing said drive member in said initial position.

6. In a dispensing machine, a rotatable dispenser and means for moving the same step by step in a certain direction, said means comprising a plurality of drive elements arranged on said dispenser in spaced relation about the rotational axis thereof, a driving member arranged for back and forth motion adjacent said drive elements, spring means urging said drive member into an initial position, means carried by said drive member and engaging one of said elements to move said dispenser when the drive member is moved from said initial position and arranged to disengage said element and drivingly engage the next succeeding element when the driving member is restored to initial position, means coacting with said drive elements for preventing retrograde movement of said dispenser, and means including a blocking member normally disposed in blocking position relative to one of said drive elements by said driving member when the latter is in initial position, and moved out of blocking position only when the driving member is moved a certain distance away from initial position.

7. In a dispensing machine including a rotatable dispenser, drive mechanism comprising, in combination: a drive plate mounted for oscillation about an axis parallel to the axis of rotation of the dispenser, spaced drive means arranged in a circle concentrically of said axis on the dispenser, means on said drive plate providing unidirectional driving engagement with said spaced means such that oscillation of the drive plate will effect step by step movement of the dispenser in one direction, and blocking means on said drive plate and displaced angularly from said unidirectional drive means thereon so as to lie in movement-obstructing relation to said spaced means when the drive plate is in an initial position and to be moved out of obstructing relation with the spaced means when the drive plate is moved a certain amount out of initial position.

8. In a dispensing machine including a rotatable dispenser, step by step drive means including drive elements spaced on the dispenser about the axis of rotation thereof, a drive member arranged for back and forth movement adjacent the path of movement of said drive elements, a unidirectional driving pawl pivoted on said drive member and normally engaging one of said drive elements when the drive member is in a normal position for movement of the dispenser when the drive member is moved from normal position, and means on said drive member and spaced from said pawl so as to lie in blocking position relative to the next preceding drive element and moved out of blocking position when the drive member is moved a certain amount away from normal position, and means for preventing retrograde movement of said dispenser.

9. In a dispensing machine of the type including a gravity feed hopper and a dispensing drum with merchandise compartments therein and mounted for rotation beneath said hopper to move said compartments successively into and out of registration with a discharge opening, the combination with said drum of a conically shaped cap portion mounted at the center of rotation of the drum with its surfaces inclining toward said compartments, and a deflecting apron mounted above said discharge opening and including oppositely pitched sides inclining toward those compartments respectively approaching and leaving said opening, said oppositely pitched sides converging in an apex which is fitted in close proximity to the apex of said conical cap, said oppositely pitched sides of the apron having edge portions converging into said apex thereof and which are disposed in close proximity to the surface of said cap whereby to prevent material from said hopper from working beneath the apron, the conical surface of said cap and oppositely pitched surfaces of said apron coacting to effect uniform distribution of material from said hopper into said compartments.

JOSEPH W. SRODULSKI.